United States Patent Office 3,509,151
Patented Apr. 28, 1970

3,509,151
MOLECULAR COMPOUNDS OF 4 - (AMINOETH-ANESULFONYLAMINO) - ANTIPYRINE OR AMI-NOETHANESULFONYL - p - PHENETIDINE AND BARBITALS
Shun-Ichi Naito, 35 Murasakino Kamitorida-cho, Kita-ku, Kyoto, Japan
No Drawing. Filed Nov. 25, 1968, Ser. No. 778,832
Int. Cl. C07d 51/22
U.S. Cl. 260—258        5 Claims

ABSTRACT OF THE DISCLOSURE

Molecular compounds made up of 1 mole of a barbital and 2 moles of 4-(aminoethanesulfonylamino)-antipyrine or aminoethanesulfonyl-p-phenetidine are obtained by the reaction with or without a solvent and the resulting compounds have pronounced analgesic and antipyretic activity. The molecular compounds are formed in the designated proportions irrespective of the relative amounts of the starting materials. Various barbitals can be used including barbital itself, allobarbital, cyclobarbital, phenobarbital, aprobarbital, amobarbital, pentobarbital, secobarbital, binbarbital, butabarbital and mephobarbital. The reactions can be carried out either by heating the reactants to their melting points or by heating them in water, a lower aliphatic alkanol or other organic solvents, or a mixture thereof, water being preferred as it gives the best yield.

---

This invention relates to molecular compounds of 4-(aminoethanesulfonylamino)-antipyrine or aminoethanesulfonyl-p-phenetidine and a barbital of which many different barbitals may be employed and several of which are exemplified below. The reactants are combined in the proportions of 1 mole of the barbital to 2 moles of the antipyrine or phenetidine to form stable crystalline compounds having pronounced analgesic and antipyretic activity irrespective of the relative amounts of the starting materials, so that if the amounts of the starting materials are not in the designated proportions, there will be an excess of one reactant remaining in unreacted condition. The reaction is carried out either by heating the reactants to their melting points without a solvent or diluent or by heating them and causing the reaction to take place in water, methanol, ethanol or other organic solvents, or a mixture of such solvents, water having been found to be best as it gives a particularly high yield and it is therefore preferred. The starting antipyrines and phenetidines are novel intermediates and are prepared for example by the hydrolysis of their acyl derivatives, e.g. 4-(acylaminoethanesulfonylamino) - antipyrine and acylaminoethanesulfonyl-p-phenetidine. In effect these products of hydrolysis which constitute the starting materials are combined with taurine which is an essential amino acid having surface-active action and the final compounds are stable, water-soluble analgesics and antipyretics having low toxicity and high stability even in aqueous solutions over prolonged periods of time.

It has been found that a wide variety of barbitals can be employed to react with the antipyrines and phenetidines including but not limited to barbital, allobarbital, cyclobarbital, phenobarbital, aprobarbital, amobarbital, pentobarbital, secobarbital, binbarbital, butabarbital and mephobarbital.

The molecular compounds which are useful as analgesics and antipyretics in the usual manner of related compounds such as phenetidine are obtained in fixed proportions of components regardless of the amounts of the starting materials which are present, so that the new molecular compounds are always made up of 1 mole of the selected barbital combined with 2 moles of the antipyrine or phenetidine. The melting points are constant even when the reaction ratios of the starting materials vary considerably. In making the new molecular compounds, the above noted antipyrine or phenetidine and the selected barbital are dissolved in water, concentrated by a direct flame, filtered and allowed to stand until crystals separate. Representative compounds and their moles and melting points are set forth in the following tables.

TABLE 1

| Moles of antipyrine | Barbitals and moles | Melting point of the product (° C.) |
|---|---|---|
| 1 mole | Barbital, 1 mole | 156–164 |
| 2 moles | do | 155–165 |
| 3 moles | do | 155–164 |
| 0.5 mole | do | 155–165 |
| 1 mole | Allobarbital, 1 mole | 140–157 |
| 2 moles | do | 142–158 |
| 3 moles | do | 142–157 |
| 0.5 mole | do | 143–158 |
| 1 mole | Cyclobarbital, 1 mole | 162–168 |
| 2 moles | do | 161–168 |
| 3 moles | do | 160–167 |
| 0.5 mole | do | 161–167 |

TABLE 2

| Moles of phenetidine | Barbitals and moles | Melting point of the product (° C.) |
|---|---|---|
| 1 mole | Barbital, 1 mole | 123–139 |
| 2 moles | do | 123–140 |
| 3 moles | do | 125–140 |
| 0.5 mole | do | 124–140 |
| 1 mole | Allobarbital, 1 mole | 128–132 |
| 2 moles | do | 128–132 |
| 3 moles | do | 127–132 |
| 0.5 mole | do | 128–131 |
| 1 mole | Cyclobarbital, 1 mole | 124–128 |
| 2 moles | do | 125–128 |
| 3 moles | do | 125–127 |
| 0.5 mole | do | 124–128 |
| 1 mole | Secobarbital, 1 mole | 130–142 |
| 2 moles | do | 130–142 |
| 3 moles | do | 131–141 |
| 0.5 mole | do | 130–141 |

It is particularly interesting to note from the foregoing tables that even though the amount of the antipyrine or phenetidine varies considerably, the melting point of the product produced is practically constant. In each case it is to be noted that the separated crystals were thoroughly dried in a desiccator to a constant weight and the antipyrine compound was determined in accordance with the Japanese Pharmacopeia as were the barbitals, but the phenetidines were determined as follows: A sample containing the phenetidine was dissolved and the volume adjusted to 1.5 ml. to which was added 2 ml. of 2,4-dinitrofluorobenzene (made by thoroughly mixing 0.1 g. of commercial 2,4-dinitrofluorobenzene with enough water to make 1000 ml. and separating the supernatant) as reagent. This mixture was heated on a boiling water bath for precisely 5 minutes, promptly cooled in ice water for 5 minutes, 0.5 ml. of 99.5% ethanol added, and the product estimated for the absorbence at 410 m$\mu$. Separately 1.5 ml. of water, substituted for the sample solution, was subjected to the identical procedure and its absorbence value made the blank value. The color produced (yellow) was substantially stable and unchanging, but for a safety precaution the estimation was carried out within 5 minutes after the color reaction. This color followed Beer's law when diluted below 400 mg./ml. of the phenetidine compound content.

The invention is more fully illustrated by the following non-limitative examples in which all temperatures are expressed in ° C.

EXAMPLE 1

The molecular compound of 4-(aminoethanesulfonylamino)-antipyrine and barbital

To 1 g. of 4-(aminoethanesulfonylamino)-antipyrine were added 0.3 g. of barbital and 30 ml. of water. The mixture was heated on a direct flame to make a solution, concentrated to 5–10 ml. of the total volume, filtered, and the filtrate allowed to stand to produce colorless crystals of M.P. 155–165°. Yield 11 g.

*Elementary analysis.*—Calculated for:

$$(2.C_{13}H_{18}O_3N_4S)(C_8H_{12}O_3N_2)$$

(percent): N, 17.40. Found (percent): N, 17.44.

EXAMPLE 2

The molecular compound of 4-(aminoethanesulfonylamino)-antipyrine and allobarbital To 3 g. of 4-(aminoethanesulfonylamino)-antipyrine and 2 g. of allobarbital 100 ml. of water were added to make a solution by heating. It was concentrated to about 40 ml. filtered and the filtrate allowed to stand until colorless crysals of M.P. 142–158° separated. Yield 3.1 g.

*Elementary analysis.*—Calculated for:

$$(2.C_{13}H_{18}O_3N_4S)(C_{10}H_{12}O_3N_2)$$

(percent): N, 16.90. Found (percent): N, 16.91.

EXAMPLE 3

The molecular compound of 4-(aminoethanesulfonylamino)-antipyrine and cyclobarbital 3 g. of 4-(aminoethanesulfonylamino)-antipyrine and 1.1 g. of cyclobarbital were dissolved in 100 ml. of water under heating and the solution concentrated to about 50 ml. It was filtered and the filtrate allowed to stand to obtain colorless crystals of M.P. 161–168°. Yield 3 g.

*Elementary analysis.*—Calculated for:

$$(2.C_{13}H_{18}O_3N_4S)(C_{12}H_{16}O_3N_2)$$

(percent): N, 16.34. Found (percent): N, 16.37.

EXAMPLE 4

The molecular compound of aminoethanesulfonyl-p-phenetidine and barbital 5 g. of aminoethanesulfonyl-p-phenetidine and 2 g. of barbital were dissolved in as small a volume of water as possible and the solution concentrated over a direct flame until an oil separated. When the mixture was filtered and allowed to stand there were obtained colorless crystals. Yield 5 g. The product softened partially at 123° and melted down completely at 140°.

*Elementary analysis.*—Calculated for:

$$(2.C_{10}H_{16}SO_3N_2)(C_8H_{12}O_3N_2)$$

(percent): N, 12.49. Found (percent): N, 12.45.

EXAMPLE 5

The molecular compound of aminoethanesulfonyl-p-phenetidine and allobarbital 2.4 g. of aminoethanesulfonyl-p-phenetidine and 2.1 g. of allobarbital were dissolved in as little water as possible and concentrated by heating over a free flame. It was promptly filtered and allowed to stand to obtain colorless needles of M.P. 128–132°. Yield 2 g.

*Elementary analysis.*—Calculated for $$(2.C_{10}H_{16}SO_3N_2)(C_{10}H_{12}O_3N_2)$$

(percent): N, 12.06. Found (percent): N, 12.09.

EXAMPLE 6

The molecular compound of aminoethanesulfonyl-p-phenetidine and cyclobarbital 3 g. of aminoethanesulfonyl-p-phenetidine and 1.5 g. of cyclobarbital were dissolved in as little water as possible and the solution heated over a direct flame for concentration until an oil separated when it was promptly filtered and then allowed to stand to separate colorless needles of M.P. 125–128°. Yield 3 g.

*Elementary analysis.*—Calculated for $$(2.C_{10}H_{16}SO_3N_2)(C_{12}H_{16}O_3N_2)$$

(percent): N, 11.59. Found (percent): N, 11.63.

EXAMPLE 7

The molecular compound of aminoethanesulfonyl-p-phenetidine and secobarbital 1.3 g. of secobarbital and 3 g. of aminoethanesulfonyl-p-phenetidine were dissolved in as little water as possible and the solution heated for concentration over a free flame, filtered while warm, and the filtrate allowed to stand to separate colorless needles of M.P. 130–142°. Yield 3 g.

*Elementary analysis.*—Calculated for $$(2.C_{10}H_{16}SO_3N_2)(C_{12}H_{18}O_3N_2)$$

(percent): N, 11.56. Found (percent): 11.54.

What is claimed is:

1. A compound selected from the group consisting of a molecular compound of 2 moles of 4-(aminoethane-sulfonylamino)-antipyrine and 2 moles of aminoethanesulfonyl-p-phenetidine and 1 mole of a barbital selected from the group consisting of barbital, allobarbital, cyclobarbital, phenobarbital, aprobarbital, amobarbital, pentobarbital, secobarbital, binbarbital, butabarbital and mephoarbital.
2. A compound according to claim 1 wherein the selected barbital is combined with the phenetidine.
3. The compound 4-(aminoethanesulfonylamino)-antipyrine.
4. A compound according to claim 1 wherein the selected barbital is combined with the antipyrine.
5. The compound 4-(aminoethanesulfonyl-p-phenetidine.

References Cited

UNITED STATES PATENTS

| | | | |
|---|---|---|---|
| 1,478,463 | 12/1923 | Volwiler | 260—259 |
| 1,530,021 | 3/1925 | Thiele | 260—259 |

ALEX MAZEL, Primary Examiner

A. M. T. TIGHE, Assistant Examiner

U.S. Cl. X.R.

260—259; 424—254